Sept. 14, 1965   R. J. HOUDESHELL ETAL   3,206,046
CHARGING APPARATUS FOR STEEL MAKING FURNACES
Filed Dec. 13, 1962   6 Sheets-Sheet 1

INVENTORS.
ROBERT J. HOUDESHELL
JAMES D. LIGHTBODY
BY
ATTORNEY

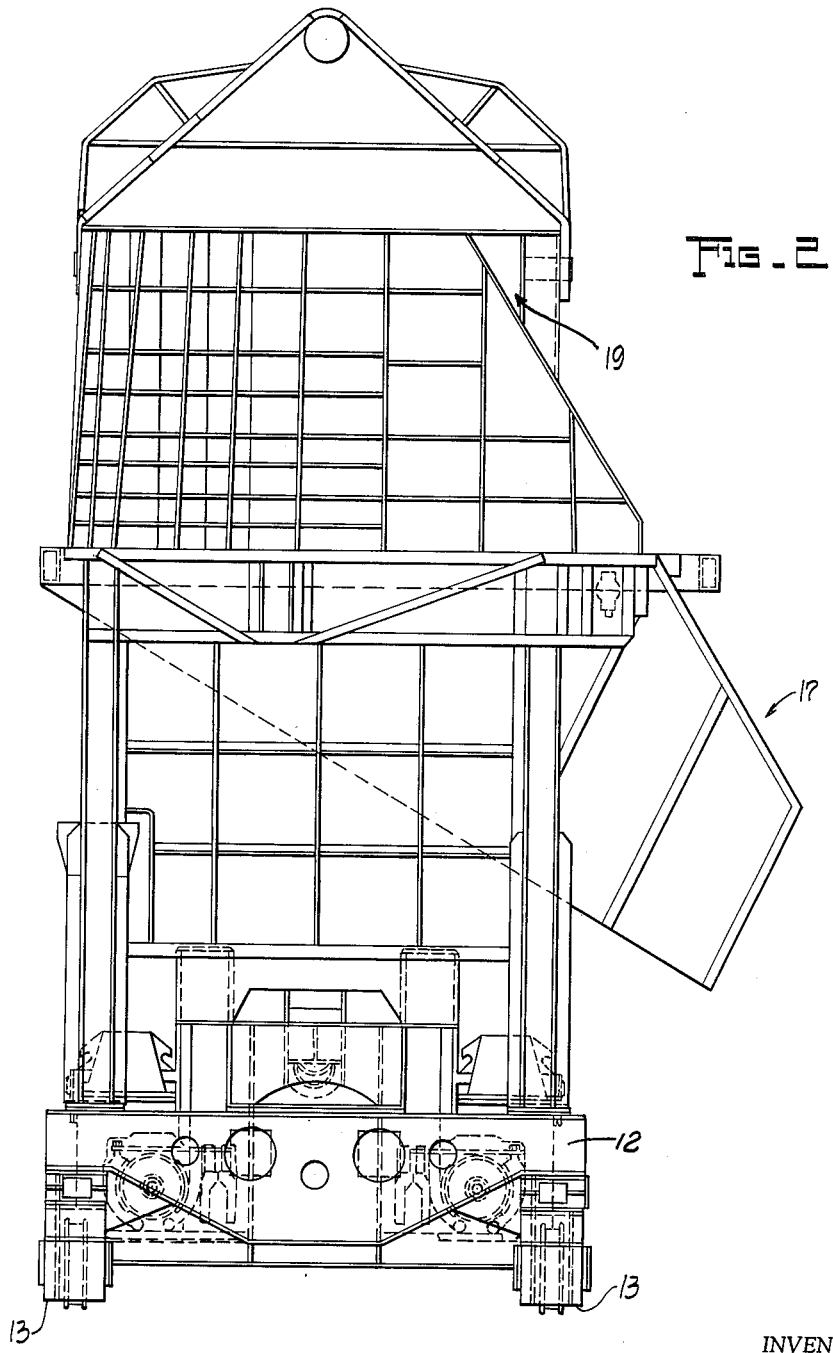

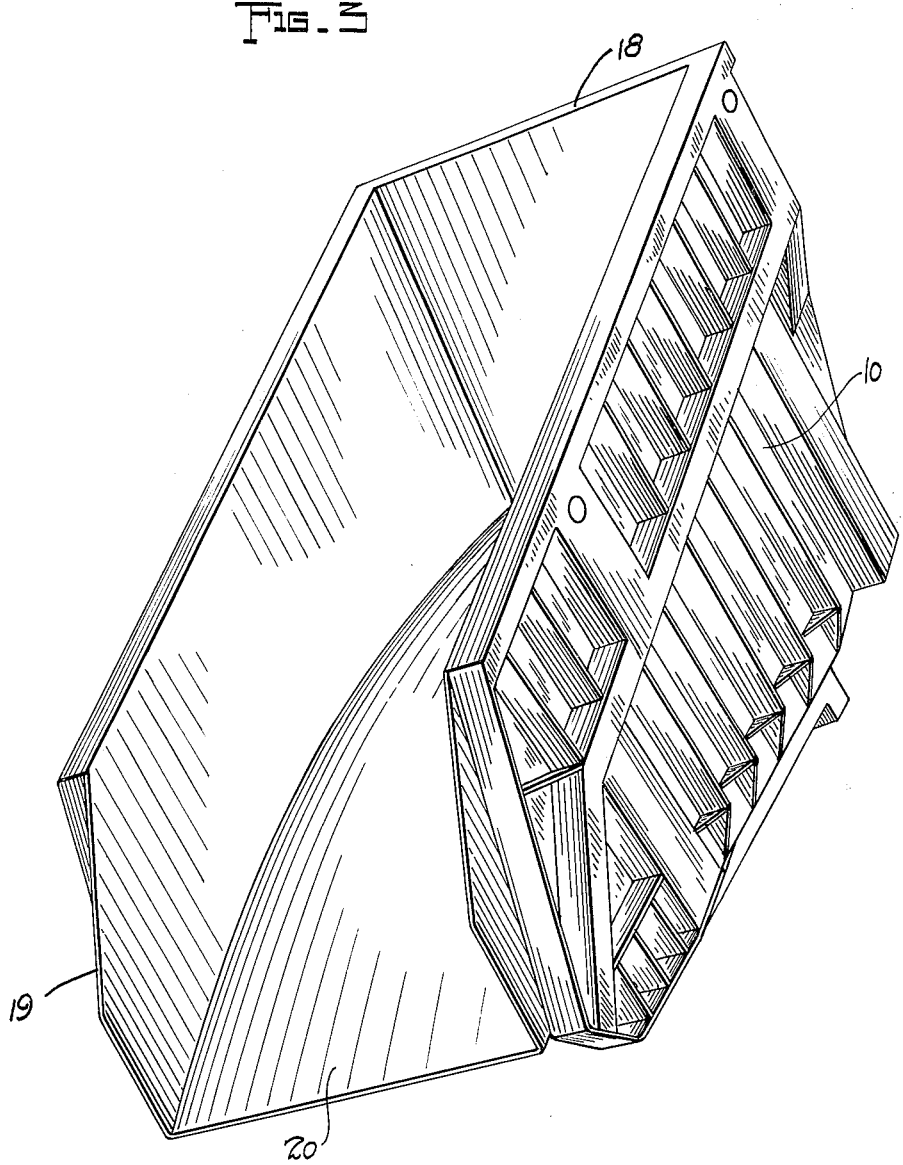

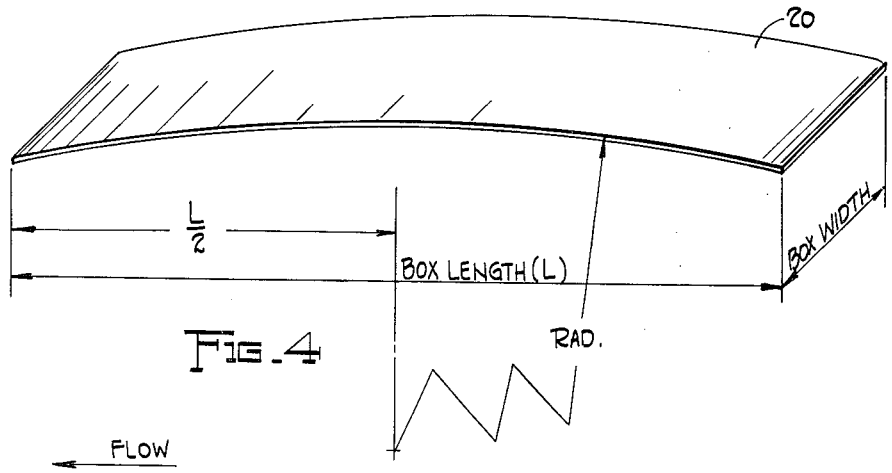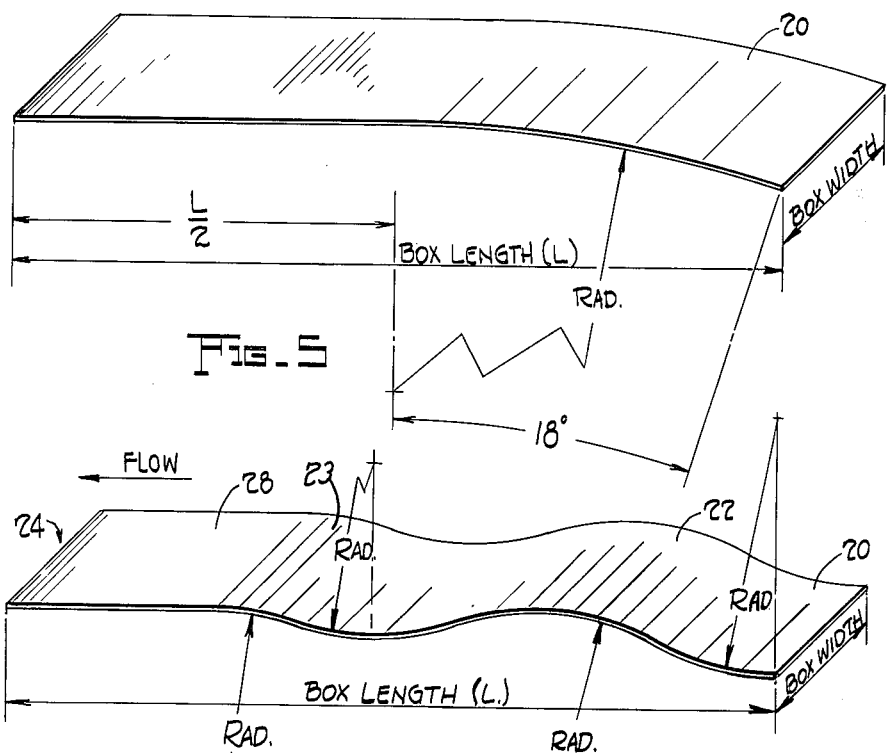

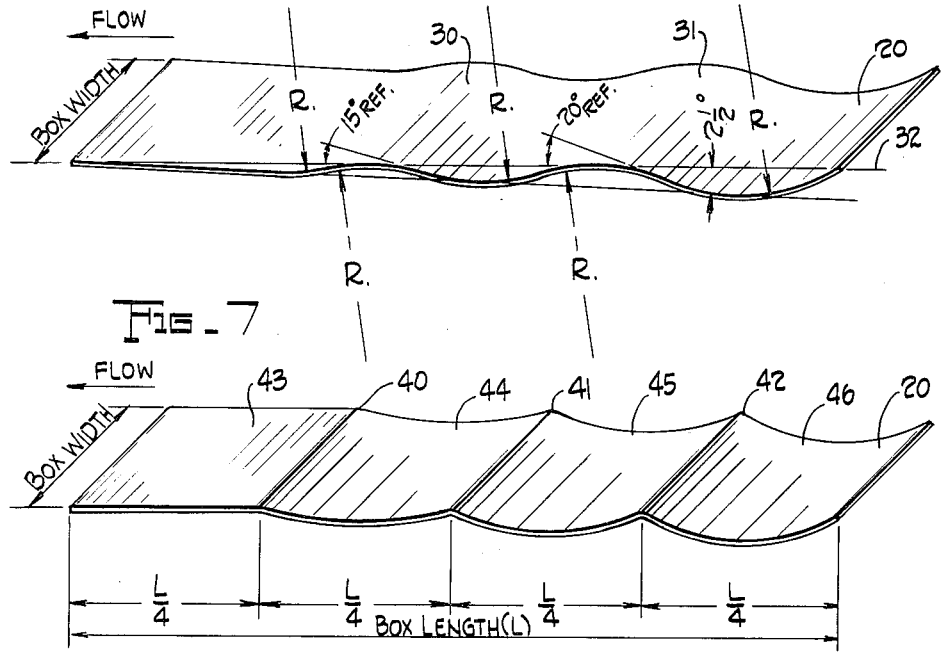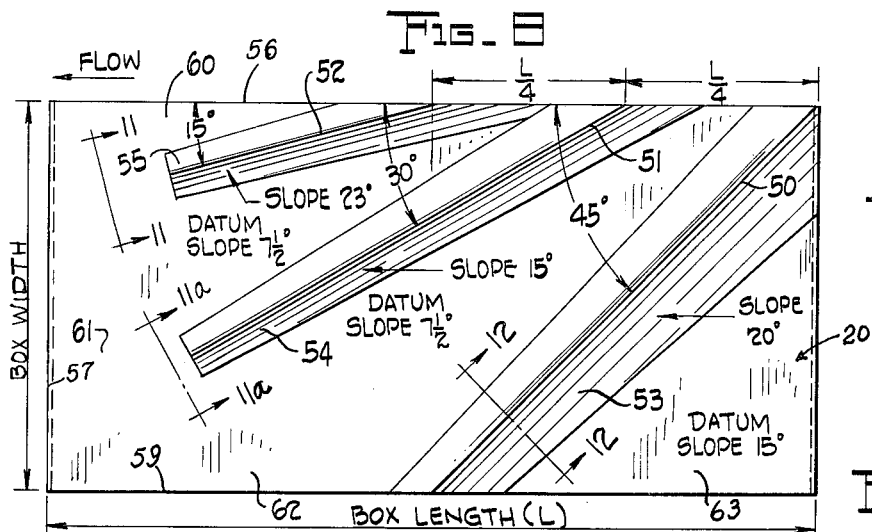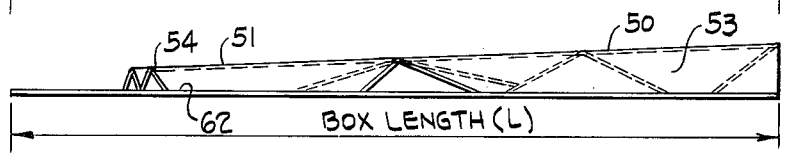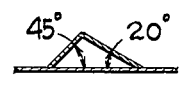

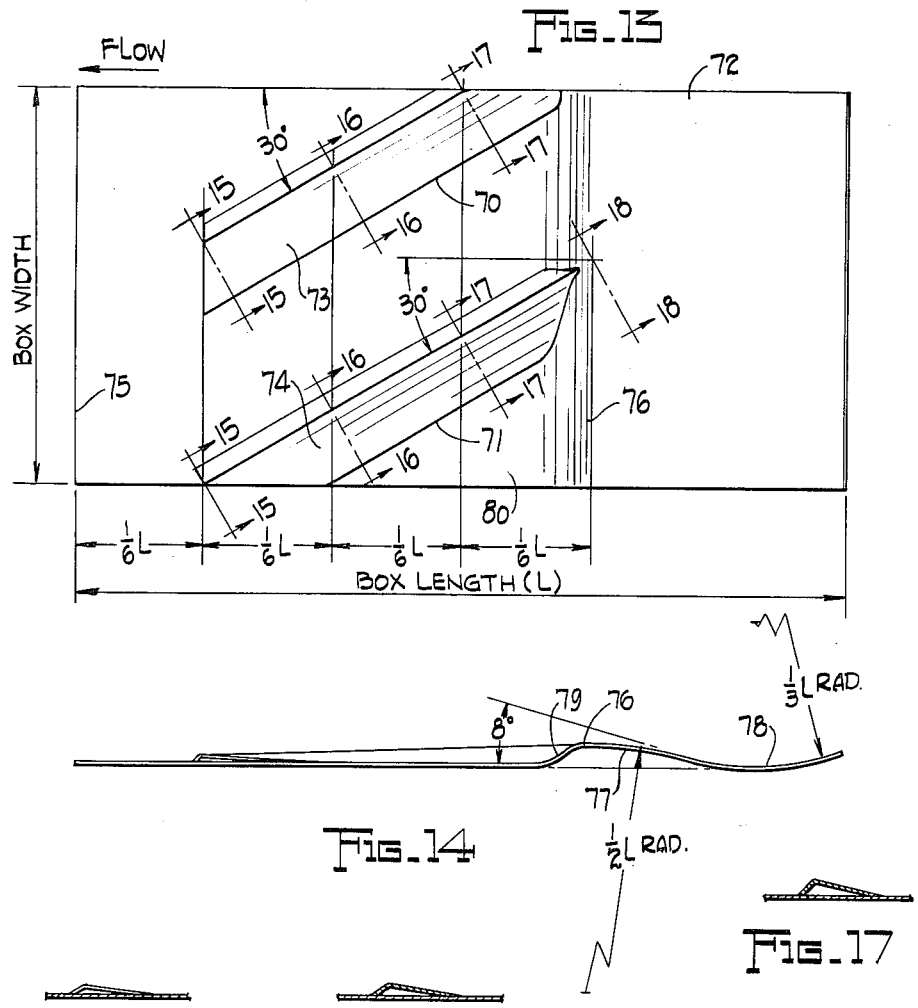

3,206,046
CHARGING APPARATUS FOR STEEL MAKING
FURNACES
Robert J. Houdeshell, North Olmsted, and James D. Lightbody, Cleveland, Ohio, assignors, by mesne assignments, to McDowell-Wellman Engineering Company
Filed Dec. 13, 1962, Ser. No. 244,361
5 Claims. (Cl. 214—18)

This invention relates, as indicated, to an improved apparatus particularly useful for orienting and delivering scrap metal, for example, scrap iron, from one container to a furnace, and more particularly adapted for use in orienting and delivering scrap metal to a chute or to a metal treating furnace, such as a basic oxygen furnace.

The present invention has particular utility with respect to the direct charging of scrap metal to the narrow mouth opening of a basic oxygen furnace, or indirectly to such furnace through an intermediate chute, or to charging directly or indirectly into other steel making processes, e.g. electric smelting. The following description will be confined for illustrative purposes, however, to the indirect introduction of scrap iron to a basic oxygen furnace, which is the preferred utility of the apparatus.

The introduction of the basic oxygen process for the production of steel has brought economies in steel production. At the same time, problems have been introduced by the nature of the apparatus used and the conditions under which the process is performed. Introduction of this process has necessitated handling scrap with greater facility and speed in orienting and discharging the metal into the furnace. The furnace which is used in converting the charge to purified metal, that is for chemically removing impurities such as carbon, silicon, phosphorus, etc., is generally a narrow mouth refractory lined, steel jacketed vessel. The sidewalls of the furnace converge to provide a mouth or opening which is narrower than the maximum width or diameter of the receptacle. Desire to improve entry of scrap metal through such an opening in an efficient manner without damage to the lining has resulted in the design of special equipment for progressively introducing a body of scrap iron into a basic oxygen furnace, and it is to the provision of an improved apparatus of this type that this invention is particularly directed.

Scrap metal is contemplated herein is most usually a heterogeneous mixture of miscellaneous scrap of irregular size and composition including mill scrap as well as scrap from junk yards. Components of a scrap charge may range in weight from a few grams to several tons.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

The invention will be better understood by having reference to the annexed drawings which illustrate a preferred embodiment of a scrap metal charging apparatus in accordance herewith and wherein:

FIG. 2 is a front elevation of a scrap metal charging apparatus such as shown in FIG. 1 showing details of the box supporting structure, the chute supporting structure and a form of turning-chute useful herein.

FIG. 3 is a perspective view of a scrap metal box showing one form of bottom useful in effecting progressive discharge of scrap metal from the box.

FIGS. 4–19 show various structures for the bottom of the scrap metal charging box by which regulation of the rate of discharge of the scrap metal therefrom may be effected.

Figure 1:
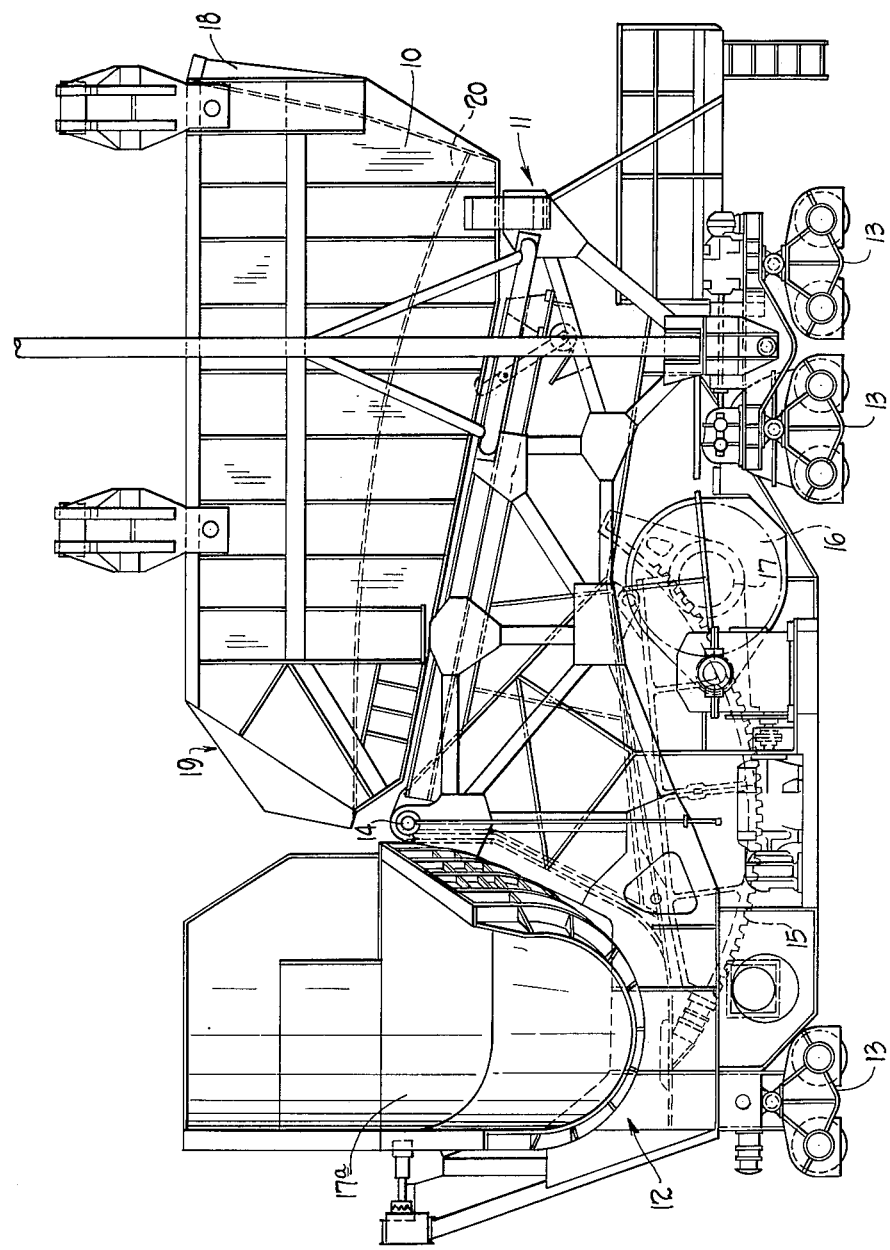
FIG. 1 is a side elevation of a scrap iron charging apparatus of this invention showing a scrap metal charging box, and chute coacting therewith for progressive discharge of scrap metal indirectly into a furnace such as a basic oxygen furnace.

Briefly stated, then, the present invention is in the provision of an apparatus for receiving and discharging scrap metal which comprises a scrap metal confining box closed at the bottom and open at the top and at one end, and material discharge regulating means including a predetermined contoured configuration for the bottom of said box coacting therein to develop a substantially progressive discharge for the scrap metal as the box is tilted. In a preferred embodiment, the contoured configuration is a smooth, wave-form, particularly defining a plurality of barriers of progressively increasing height inwardly spaced along the bottom from the discharge end, and coacting to progressively restrain the flow of material for successive release in response to the attainment of successive tilt angles of discharge corresponding to successive barriers, respectively.

Referring now more particularly to the annexed drawings, there is here shown a preferred form of scrap metal charging apparatus wherein there is provided a material receiving box or container 10 which is adapted to carry scrap metal. Box 10 may have a capacity as high as 150 tons of scrap metal. Box or car 10 is preferably constructed so as to be releasably supported on a platen generally indicated at 11, which is in turn supported on a rigid support generally indicated at 12. The rigid support 12 may be secured to the foundation or may be mounted upon wheeled trucks such as trucks 13 for movement along a track way adjacent to the basic oxygen furnaces. Accordingly, box 10 may be loaded with scrap metal at a point remote from the furnace area and transported to the furnace area for mounting on the platen 11, as hereinafter more particularly described.

Platen 11 may be of any suitable form adapted to receive and retain in a releasable manner, box 10 thereon. Platen 11 is pivoted for rotation about pivot 14 which is supported by any suitable means on rigid support 12. Platen 11 is tiltable so as to cause discharge of scrap metal contained in box 10. Any suitable means for effecting tilting of box 10 to discharge the contents thereof may be used. As shown in dotted lines in FIG. 1, a large gear secured to the platen 11 is driven by a motor 16 and pinion gear 17. The driving means for elevating box 10 into the material discharging position forms no part of the present invention, and any other means may be used in place thereof.

As indicated above, the movable support means and the rigid support means form no part of the present invention, and for which any conventional suitable structure may be used.

The present invention is concerned primarily with the contour of the bottom of box 10 which, as indicated above, is so constructed and adapted as to provide for progressive discharge of the contents of the box as box 10 is elevated and rotated above a pivot point, such as point 14.

Generally speaking, box 10 is of generally elongated rectilinear configuration, deeper at the closed end 18 than at the discharge or open end 19. Box 10 is preferably longer than it is wide, and the cross section at any point along the longitudinal axis is preferably a rectangle.

In FIG. 1, there is shown in dotted lines, a curved bottom plate 20, illustrating one form of discharge control means useful in accordance with the present invention. It will be observed that as box 10 is tilted counterclockwise about the pivot point 14 shown in FIG. 1 the effect of the contoured bottom 20 is to permit progressive discharge of the contents of box 10 instead of a sudden and complete discharge of all of the contents at the moment the angular disposition of box 10 reaches and begins to exceed the angle of repose of the scrap material contained in the fore part of box 10.

In order to illustrate various forms of contoured bottom structures useful in accordance with the present invention, FIGS. 4 through 19 have been presented.

FIG. 4, for example, shows a bottom structure formed from a steel plate of suitable thickness, for example 1″ thick and curved along the arc of a circle having a diameter of approximately 116 feet. This section of a circle is cut to provide a cord equal to the length of the box 10 and a width equal to the width of the box. Transverse and longitudinal stiffeners may be provided if desired.

FIG. 5 shows another contoured structure for the bottom 20 of box 10. In this case, the forward portion of the bottom is flat, and the rearward portion is curved. The bottom 20 of FIG. 5 may be secured into the box structure such as shown in FIG. 1 by any suitable means, e.g. welding. As the box is tilted forward, it will be observed that the forward section of the box will be discharged of its burden of scrap metal prior to the discharge of the after section, the transition point acting as an impediment to the further discharge of scrap metal from the box until such time as the angular disposition of the box 10 with respect to pivot point 14 is such as to exceed the angle of repose of material in the after section.

FIG. 6 shows another form of bottom 20 useful in controlling the rate of discharge of scrap metal from a box 10, the direction of flow being indicated by the arrow as with the previous illustrations. In the modification shown in FIG. 6, the bottom is given a wave-form shape, the crests 22 and 23 constituting ridges which impede the flow of scrap metal successively as a box including the bottom structure of FIG. 6 is tilted through successive discharging angular positions. It will be noted that the wave crests 23 and 22, respectively, increase in height in a direction away from the discharge end 24. In the embodiment shown in FIG. 6, the wave-form is generated by the merger of arcs of circles struck at centers disposed alternately above and below the bottom plate 20 on a preselected radius and tangentially intersecting each other to form a smooth curve. It will be noted that the extensions of lines tangent to the intersection of the arcs describing the curve with reference to the forepart 28 of the bed 20 which is considered the datum plane shows progressive increase in effective slope of the barriers for retaining scrap metal therebehind until the angular disposition of the box 10 with respect to the angle of repose of the scrap metal permits release of the material over the barriers.

FIG. 7 shows another embodiment of a wave-form structure and having barriers 30 and 31 which are in effect the crests of wave-forms or sinuous form generated by the tangential intersection of arcuate portions of a circle generated on a predetermined radius, e.g. one-fifth the box length radius. The extension of the tangent of intersection of the opposed arcuate circular sections defining barrier 30 is located at an angle of 15° with respect to the normal, and the corresponding tangent of barrier 31 is disposed at an angle of 20° with respect to the normal indicated by the numeral 32.

The rearward portion of bottom 20 is curved upwardly at the rearward extremity 33 in order to prevent jamming of material between the back 18 of the box 10 and the bed or bottom 20.

FIG. 8 shows another bottom structure in cuspate form and provided with a plurality of successively increasing crest depths. In FIG. 8, the barriers 40, 41 and 42 may be considered as having been generated by tracing the surface of the intersection of three hollow cylinders having their axes parallel. In discharging materials from a bottom contoured as shown in FIG. 8, scrap material resting on the forward portion 43 will be discharged first. Scrap material resting within cusp or depression 44 will be next, that resting in depression 45 next, and that in depression 46, the last to leave the box 10. The effect of the crests 40, 41 and 42 is to divide the scrap load into four portions, and to successively discharge these portions as the box 10 is tilted about point 14.

Another method for accomplishing the same progressive discharge is to provide a plurality of barriers in the form of angularly disposed ridges, as shown in FIG. 9 to FIG. 12, inclusive. Thus, FIG. 9 shows a bottom 20 of the same general outline as shown in the preceding figures. Scrap metal retaining ridges 50, 51 and 52 are the crests of ridge members 53, 54 and 55, respectively, having triangular cross sections such as shown in FIGS. 11 and 12. Ridges 50, 51 and 52 are disposed at progressively decreasing angles with respect to the side wall of box 10, and originating in FIG. 9, and originating at points along the side wall or side marginal edge 56 at regularly spaced intervals, such as at quarter-box length intervals. For example ridge 52 originates at the center line of marginal edge 56 and is disposed at an angle of 15° with respect thereto to its termination upstream of discharge lip or edge 57. Ridge or barrier 51 originates at a point on marginal edge 56 one-quarter box length to the rear of the origination of barrier 52, at an angle of 30° with respect to marginal edge 56 and continues to its termination upstream of discharge edge 57.

Barrier 50 originates at the rearward extremity of marginal edge 56, as disposed at an angle of 45° with respect thereto and continues to its intersection with the opposite marginal edge 59 of the bottom 20. Crests or barriers 50, 51 and 52 slope respectively at 20°, 15° and 23° with respect to the datum line as indicated in FIGS. 11–13, inclusive.

The effect of construction in accordance with FIGS. 9–12 is a scrap metal contained in the region forward of barrier 52, namely region 60 will be the first to be discharged, scrap metal contained in the region 61 will be next, scrap metal retained in region 62 will be the third portion of scrap metal discharged, and finally the scrap metal contained in region 63 will be discharged. Such discharge is effected by gradually and continuously raising the rearward end of the box 10 to effect tilting of the box about pivot 14 for discharge of the contents in a progressive manner into the chute 17a.

FIGS. 13–18 show another form of bottom structure adapted to control the discharge of scrap metal. This structure illustrates the combination in a box bottom of angularly disposed ridges and transverse curvilinear barriers. Accordingly, there is shown a pair of parallel ridges 70 and 71 disposed at a 30° angle with respect to marginal edge 72 and terminating upstream of the discharge edge 75. The upstream faces 73 and 74 of ridges 70 and 71, respectively, are rotated about their respective longitudinal axes in a counterclockwise direction from back to front toward the discharge edge 75 to provide cross-sections as shown in FIGS. 15 through 18, inclusive. Barrier 76, formed by the tangential joining of curved portions 77 and 78 struck on radii whose centers lie on opposite sides of the contoured bottom and which are respectively ½ the length and ⅓ the length of the box. Gradual slope 79 guides the material flowing over barrier 76 to the floor 80 where the material is then subjected to flow control by ridges 70 and 71.

FIG. 19 shows another form of flow regulating contour in accordance with this invention. In this case, the rear marginal edge 90 is raised and curves gradually to the floor datum level 91. Barrier 92 attains a maximum height which is less than that of the rear marginal edge 90. A gradual rise 93 from the floor datum 91 leads to barrier 92, and a somewhat sharper slope 94 guides the material toward the discharge lip 95. Again, it will be observed that controlled discharge of the scrap material will be secured as the rear marginal edge 90 is raised, while the discharge edge 95 moves relatively slightly, or not at all.

There has thus been provided an improved scrap metal discharge box for the progressive discharge of scrap metal therefrom. These boxes are tiltable in order to effect the discharge, and characterized by material discharge regulating means in the bottom of the box in the form of a contoured configuration and for the purpose of developing a substantially progressive discharge of the scrap metal as the box is tilted. In general, the contoured configuration comprises a plurality of barriers of progressively increasing height inwardly spaced along the bottom from the discharge end and coacting to progressively restrain the flow of material for successive release in response to the attainment of successive tilt angles of discharge corresponding to each of the successive barriers, respectively.

Other modes of applying the principle of this invention may be employed instead of those specifically set forth above, charges being made as regards the details herein disclosed, provided the elements set forth in any of the following claims, or the equivalent of such be employed.

It is, therefore, particularly pointed out and distinctly claimed as the invention:

1. An apparatus for the progressive discharge of scrap iron into a steel making furnace comprising in combination:
   (a) a base frame mounted on forward and aft wheeled trucks for movement along a trackway;
   (b) pivot means mounted on said frame and providing an axis of rotation above and intermediate said forward and aft trucks;
   (c) a sloped charging box supporting platen pivotally mounted on said pivot means for rotation about said axis;
   (d) means for tilting said platen about said axis including a gear segment secured to said platen;
   (e) motor driven pinion means coacting with said gear segment for raising and lowering said platen;
   (f) motor means for driving said pinion;
   (g) a scrap iron charging box carried by said platen, said box having a similarly configured parallel side walls and being closed at one end and along the bottom, and open at the top and at the opposite end, and having a depth at its closed end greater than the depth at the open end, the slope of the bottom marginal edges of said side walls being complementary to the slope of said platen;
   (h) said box having a material discharge regulating bottom on which said scrap iron is disposed prior to discharge, said material discharge regulating bottom being continuously convexly curved on a predetermined radius, a chord of said convexly curved bottom extending from the closed end of said box to the open end thereof and being substantially parallel to said platen, said discharge regulating bottom coacting in said box to cause substantially progressive discharge for said scrap iron as the box is tilted about said axis.

2. A tiltable scrap metal discharge box having:
   (a) a material confining box closed at one end and the bottom, and open at the top and one end, and having a depth at its closed end greater than the depth at its opened end;
   (b) means for regulating the discharge of material from the box including a convexly curved bottom being designed to cause a substantially progressive discharge for the scrap metal as the box is tilted.

3. A tiltable scrap metal discharge box having:
   (a) a material confining box closed at one end and the bottom, and open at the top and one end, and having a depth at its closed end greater than the depth at its opened end;
   (b) means for regulating the discharge of material from the box, including an alternately convexly and concavely smoothly curved bottom in the box which is designed to cause a substantially progressive discharge for the scrap metal as the box is tilted.

4. A tiltable scrap metal discharge box having:
   (a) a material confining box closed at one end and the bottom, and open at the top and at one end, and having a depth at its closed end greater than the depth at its opened end;
   (b) means for regulating the discharge of material from the box, including a plurality of ridges angularly disposed with respect to and originating from a marginal edge of the box and intersecting an adjacent marginal edge thereof, successive angles of disposition increasing in an upstream direction, and each of the ridges being of progressively greater height toward the rear portion of the box.

5. A tiltable scrap metal discharge box having:
   (a) a material confining box closed at one end and the bottom, and open at the top and one end, and having a depth at its closed end greater than the depth of its opened end; and
   (b) means for regulating the discharge of the material from the box, including a bottom of the box which has a smooth convex circular arc configuration, a chord of the arc extending from the closed end of the box to the open end of the box.

References Cited by the Examiner

UNITED STATES PATENTS

| 1,745,716 | 2/30 | Rynders | 222—564 X |
| 1,758,208 | 5/30 | Warnecke. | |
| 1,788,202 | 1/31 | Pardee et al. | 193—32 |
| 3,119,530 | 1/64 | Swanson | 222—166 |

FOREIGN PATENTS

| 866,312 | 4/61 | Great Britain. |

HUGO O. SCHULZ, *Primary Examiner.*

ERNEST A. FALLER, JR., *Examiner.*